United States Patent Office.

AARON C. ANDREWS, OF NEW HAVEN, CONNECTICUT.

Letters Patent No. 63,779, dated April 16, 1867.

IMPROVED MODE OF UNITING INDIA RUBBER WITH LEATHER.

*The Schedule referred to in these Letters Patent and making part of the same.*

TO ALL WHOM IT MAY CONCERN:

Be it known that I, AARON C. ANDREWS, of the city and county of New Haven, and State of Connecticut, have invented, made, and applied to use a certain new and useful Improvement in Uniting India Rubber with Leather or other material; and I do hereby declare the following to be a full, clear, and exact description of the said invention, reference being had to the annexed drawing, making part of this specification, wherein I have shown the section of a piece of India rubber united with a piece of leather, the parts being shown much larger than the usual size.

Heretofore leather has been united with India rubber, the edges of the leather coming against the edges of the India rubber, or else the flat surfaces of the leather and the rubber have been placed together, the rubber being vulcanized after the rubber and leather have come together.

Where the leather and rubber have been brought together, edge to edge, the extent of the surfaces in contact is so small that the union of the leather and rubber is not as strong and reliable in use as either the leather or the rubber, and sometimes they separate at this point.

The nature of my said invention consists in uniting India rubber to the surface of leather or other material by forming in such material grooves or creases, into which the India rubber is pressed previous to the same being vulcanized. By this character of union I am enabled to obtain a more intimate contact of the India rubber with the other material, and in consequence of the extent of surface contact and the interlocking of the rubber and leather, the place of union between the India rubber and such other material is as strong and reliable as the other portions of the India rubber.

The drawing illustrates this improvement, $a$ being the rubber which is pressed into the grooves $b$ in the leather or other material, $c$, and then vulcanized.

What I claim, and desire to secure by Letters Patent, is—

Uniting India rubber to leather or other material by forming grooves or creases in such material, into which the rubber is pressed previous to vulcanizing, as and for the purposes specified.

In witness whereof I have hereunto set my signature this fourteenth day of February, A. D. 1867.

A. C. ANDREWS.

Witnesses:
 MICHAEL RYAN,
 WELLINGTON MERCHANT.